United States Patent
Longo et al.

(10) Patent No.: US 9,635,808 B2
(45) Date of Patent: May 2, 2017

(54) HEAD FOR AN HEDGE TRIMMER

(71) Applicant: TECOMEC S.R.L., Reggio Emilia (IT)

(72) Inventors: Salvatore Longo, Cadelbosco Sopra (IT); Enrico Cigarini, Reggio Emilia (IT)

(73) Assignee: TECOMEC S.R.L., Reggio Emilia (IT)

( * ) Notice: Subject to any disclaimer, the term of this patent is extended or adjusted under 35 U.S.C. 154(b) by 0 days.

(21) Appl. No.: 14/883,439

(22) Filed: Oct. 14, 2015

(65) Prior Publication Data

US 2016/0106035 A1    Apr. 21, 2016

(30) Foreign Application Priority Data

Oct. 21, 2014 (IT) .............................. MO2014A0296

(51) Int. Cl.
 *A01D 34/416* (2006.01)

(52) U.S. Cl.
 CPC .................. *A01D 34/416* (2013.01)

(58) Field of Classification Search
 CPC .............. A01D 34/416; A01D 34/4165; A01D 34/4166
 USPC .................................................... 30/276, 347
 See application file for complete search history.

(56) References Cited

U.S. PATENT DOCUMENTS

| 4,086,700 | A |   | 5/1978 | Inada |
|---|---|---|---|---|
| 4,097,991 | A | * | 7/1978 | Proulx ................ A01D 34/416 30/276 |
| 4,194,287 | A |   | 3/1980 | Palmieri et al. |
| 4,276,691 | A |   | 7/1981 | Palmieri et al. |
| 4,290,200 | A |   | 9/1981 | Lombard |
| 4,493,151 | A | * | 1/1985 | Mitchell ............ A01D 34/4162 30/276 |
| 5,276,968 | A | * | 1/1994 | Collins .............. A01D 34/4162 30/276 |
| 2016/0106035 | A1 | * | 4/2016 | Longo ................ A01D 34/416 30/276 |

FOREIGN PATENT DOCUMENTS

EP         3 011 820 A1 *  4/2016

* cited by examiner

*Primary Examiner* — Hwei C Payer

(74) *Attorney, Agent, or Firm* — Pearne & Gordon LLP

(57) ABSTRACT

A head for an edge trimmer, comprising a casing (1), destined for comprising at least a cutting wire reel and to be set in rotation about an axis of rotation (X), said casing comprising at least one outlet opening (11), which is so structured as to enable passage of a portion of the cutting wire. The head comprises two bushes (12) which laterally delimit the outlet opening (11) and are rotatable about a respective axis of rotation (Y).

6 Claims, 1 Drawing Sheet

HEAD FOR AN HEDGE TRIMMER

The invention relates to a head for an hedge trimmer.

The heads for hedge trimmers comprise a casing wherein there are housed a cutting wire reel and a mechanism which allows winding and/or unwinding of the cutting wire reel. At least two end portions of the cutting wire project out from the casing through corresponding side openings. During use, the wire portions projecting outwardly the casing, wear out progressively due to the fact that they come in contact with the plants to be cut. The worn portions can be replaced by partially unwinding the cutting wire reel via aforementioned mechanism which is comprised within the casing. In some hedge trimmer heads, once the reel is terminated, it is possible to replace it with a new one inside the casing or, in other types of heads, wrapping of the new reel can occur by means of aforementioned mechanism predisposed internally of the casing.

The casing is intended to be coupled to a drive shaft, to be driven in rotation at a desired speed. The speed of rotation of the casing is generally in the range of 10,000-12,000 rev./min.

The end portions of the cutting wire, which as mentioned project out of the casing through a respective opening, come repeatedly into contact with the plants and are therefore subject to intense stresses directed substantially along a tangential direction, i.e. perpendicular to the axis of rotation of the head. Such stresses lead terminal portions to flex, impact and crawl against the side edges of the outlet openings. The impact and friction produced by the outlet openings on the side edges, together with the bending stresses, rapidly result in breakage of the terminal portions, which must then be replaced with a further portion of the cutting wire, even if not yet completely worn. This results in a consumption of wire much greater than it would actually be necessary.

The object of the present invention is to provide a head for an hedge trimmer which allows to overcome the drawbacks of the heads of the known type.

One advantage of the head according to the present invention is that it significantly reduces the friction between the end portions of the cutting wire and the side edges of the outlet opening.

Another advantage of the head according to the present invention is that it considerably reduces the impacts between the end portions of the cutting wire and the side edges of the outlet opening.

Further characteristics and advantages of the present invention will better emerge from the detailed description that follows of a preferred embodiment of the invention, illustrated by way of non-limiting example in the accompanying figures wherein.

The head according to the present invention comprising a casing (1), intended to contain at least one cutting wire reel and to be set in rotation about an axis of rotation (X). Connection means (C), comprising for example a threaded hole, are predisposed for allowing the head to be coupled to a drive shaft. A mechanism (M) of the known type and therefore not described in detail, is comprised within the casing (1) in order to allow winding and/or unwinding of the cutting wire reel. The casing (1) comprises at least one outlet opening (11), which is so structured as to enable passage of a portion of the cutting wire. Such portion of the cutting wire, not shown in the figure, is destined to come into contact with the plants during rotation of the head. Preferably the casing comprises two outlet openings (11) which are arranged in diametrically opposite positions relative to the axis of rotation (X) in order to keep the balancing of the head during rotation thereof.

For each outlet opening (11), the head comprises two bushes (12) which laterally delimit the outlet opening (11). These bushes (12) are rotatable about a respective axis of rotation (Y).

Owing to the bushes (12), the stresses produced on the portion of the cutting wire projecting outwardly through the outlet opening (11), are notably reduced. As already explained above, the projecting portions are urged to flex in a plane substantially perpendicular to the axis of rotation (Y) while bumping against the plants during rotation of the trimmer head about the axis of rotation (Y). While flexing, the projecting portions crawl and collide against the side edges of the opening (11). Instead of crawling on the side edges of the opening (11), the projecting portions of the cutting wire of the inventive trimmer head, crawl on the bushes (12), which bushes (12) are free to rotate, thus giving rise primarily to a rolling friction in place of a sliding friction. In this way the projecting portions wear is reduced significantly. The fatigue stresses due to the impacts on the side edges of the opening (11) are considerably damped as well, since the wire encounters a curved surface which allows to increase the angle of deflection thereof.

The bushes (12) have a cylindrical conformation. The bushes (12) are arranged at a determined distance from one another, in order to not constrain the wire, but to maintain a certain clearance between the outer surfaces thereof and the wire itself. This further enhances the advantages described above. Preferably, the axes of rotation (Y) of the bushes (12) are parallel to the axis of rotation (X) of the trimmer head.

Figure 1:
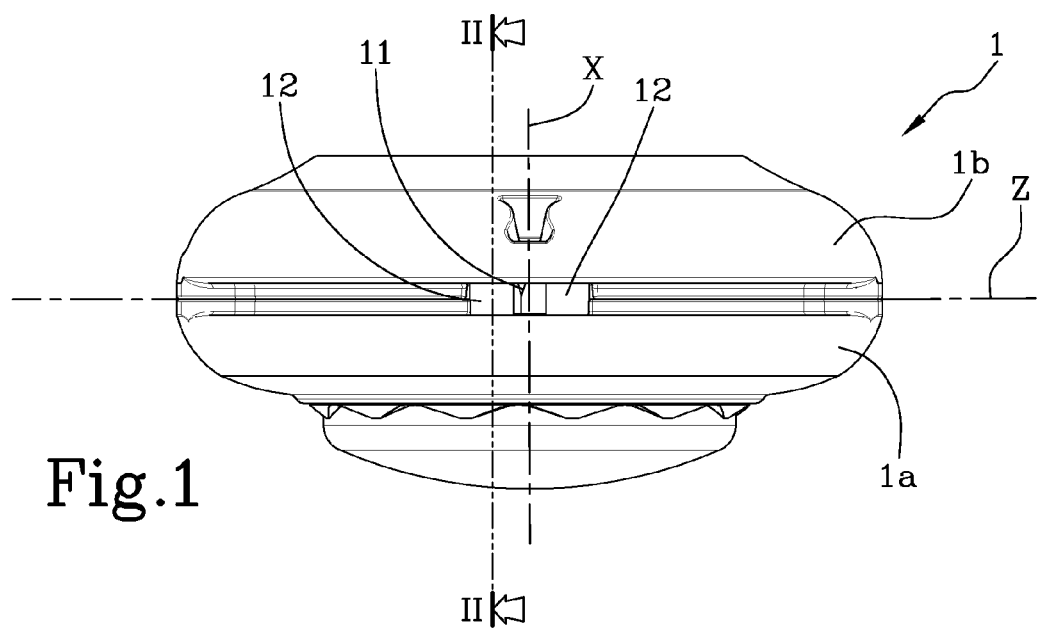
FIG. 1 shows a schematic view of the head according to the present invention.
Figure 2:
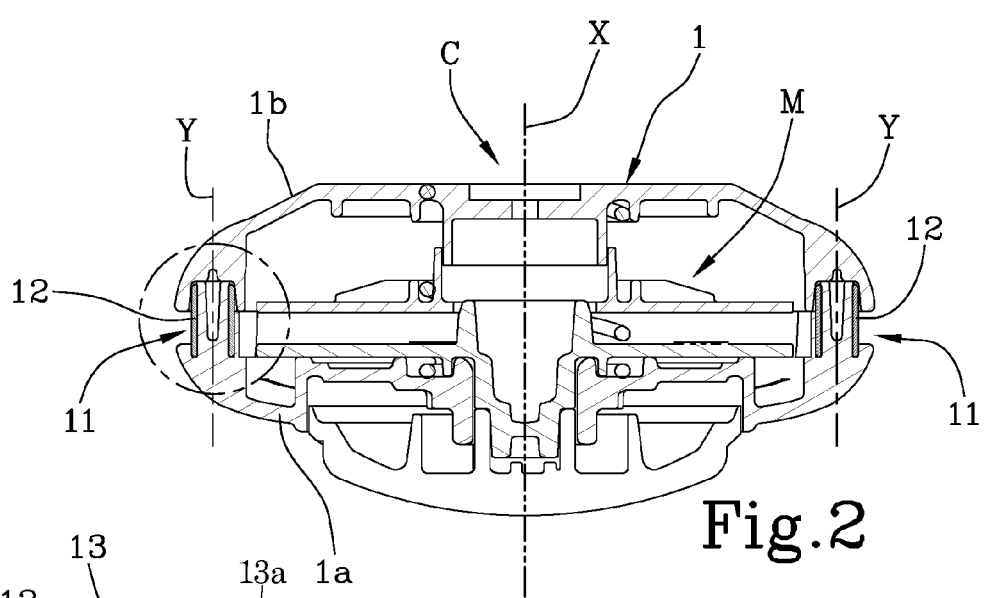
FIG. 2 shows a sectional view taken along the plane II-II of FIG. 1.
Figure 3:
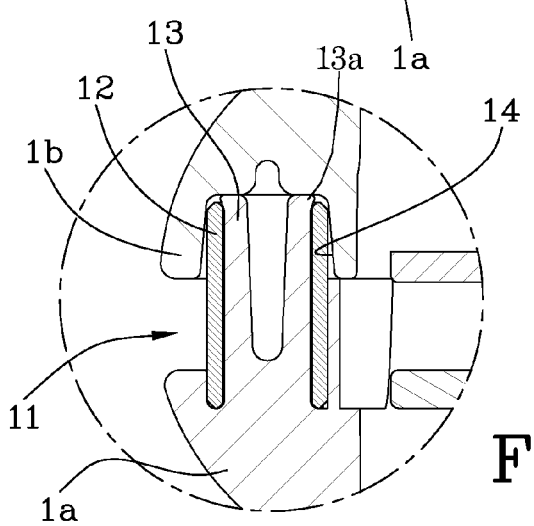
FIG. 3 shows an enlarged view of FIG. 2.

As shown in FIGS. 2 and 3, for each opening (11) the casing (1) comprises two pins (13) on each of which a bush (12) is rotatably engaged. The pins (13) are concentric to the axes of rotation (Y) of the bushes (12). The casing (1) comprises two seats (14) which are so structured as to accommodate at least one end portion of a respective bush (12). Each seat (14) is aligned to a respective pin (13) along the axis of rotation (Y) of the respective bush (12). Preferably, the seats (14) exhibit a conical shape, enlarging from a bottom portion towards an insertion opening of the bushes (12). This facilitates insertion of the bushes (12) therein. In addition, the conical shape of the seats (14) reduces the contact surface with the bushes (12), so that said bushes (12) are free to rotate and to tilt relative to the pins (13) thereof.

In the embodiment illustrated, the casing (1) comprises a first half-shell (1a) and a second half-shell (1b) being removably coupled one to another relative to a median plane (Z). The possibility of separating the two half-shells allows to have access internally of the trimmer head.

For each opening (11), the first half-shell (1a) comprises two pins (13) on each of which a bush (12) is rotatably engaged. Substantially, the pins (13) project out vertically to the two opposing sides of the opening (11).

Each pin (13) is radially deformable, so as to facilitate engagement of the bush (12) thereof. In particular, each pin (13) is internally hollow and may be provided with one or more notches lying on planes which are parallel to the axis of rotation (Y). In this manner, a bush (12) may be fitted on the pin (13) thereof from the free end of the pin itself. During insertion, the pin (13) is free to contract, thereby facilitating sliding of the bush (12). The free end of each pin (13) is preferably provided with a projection (13a), the diameter of which is greater than the diameter of the remaining part of the pin (13) and greater than the inner diameter of the bushes (12). Such projection is so structured as to project out from the bush (12) when the latter is fully engaged on the pin (13) thereof, thus forming an undercut by which the bush (12) is held in position.

The second half-shell (1b) comprises, for each opening (11), two seats (14) which are so structured as to accommodate at least an end portion of a respective bush (12). The pins (13) and the seats (14) are aligned with one another so that, when the two half-shells (1a, 1b) are coupled together, the bushes (12) are disposed at least partially within the seats (14). In this way, the bushes (12) also act as centering elements in order to facilitate the coupling between the two half-shells (1a, 1b).

The invention claimed is:

1. A head for a hedge trimmer, comprising a casing (1), destined for containing a cutting wire reel and to be set in rotation about an axis of rotation (X), said casing comprising at least one outlet opening (11), which is so structured as to enable passage of a portion of a cutting wire, characterized in that it comprises two bushes (12) which laterally delimit the outlet opening (11) and are rotatable about a respective axis of rotation (Y), wherein the casing (1) comprises two seats (14) each of which is so structured as to accommodate at least an end portion of a respective one of the bushes (12), wherein the seats (14) have a conical shape enlarging from a bottom portion towards an insertion opening of the bushes (12).

2. A head according to claim 1, wherein the casing (1) comprises two pins (13) on each of which a respective one of the bushes (12) is rotatably engaged.

3. A head according to claim 1, wherein the casing (1) comprises a first half-shell (1a) and a second half-shell (1b) coupled to each other at a median plane (Z).

4. A head according to claim 3, in which the first half-shell (1a) comprises two pins (13) on each of which a respective one of the bushes (12) is rotatably engaged.

5. A head according to claim 4, in which the second half-shell (1b) comprises said two seats (14) each of which is so structured as to accommodate at least one end portion of a respective one of the bushes (12), and in which the pins (13) and the seats (14) are mutually aligned so that, when the two half-shells (1a, 1b) are coupled together, the bushes (12) are disposed at least partially within the seats (14).

6. A head according to claim 3, in which the second half-shell (1b) comprises said two seats (14) each of which is so structured as to accommodate at least one end portion of a respective one of the bushes (12).

* * * * *